(12) United States Patent
Hase

(10) Patent No.: US 7,142,378 B2
(45) Date of Patent: Nov. 28, 2006

(54) LENS GUIDE APPARATUS

(75) Inventor: Hiroyuki Hase, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/243,620

(22) Filed: Oct. 5, 2005

(65) Prior Publication Data

US 2006/0072220 A1 Apr. 6, 2006

(30) Foreign Application Priority Data

Oct. 5, 2004 (JP) .............................. 2004-292705

(51) Int. Cl.
*G02B 7/02* (2006.01)
*G02B 15/14* (2006.01)
*G03B 17/00* (2006.01)

(52) U.S. Cl. ...................... 359/823; 359/694; 359/696; 359/81; 359/82

(58) Field of Classification Search ................ 359/823, 359/826, 694, 696–698; 396/81, 82, 89; 348/345

See application file for complete search history.

(56) References Cited

U.S. PATENT DOCUMENTS

| 4,816,860 | A | * | 3/1989 | Iida et al. | ...................... 396/80 |
| 4,847,650 | A | * | 7/1989 | Iida et al. | ...................... 396/82 |
| 4,935,763 | A | * | 6/1990 | Itoh et al. | ...................... 396/81 |
| 5,150,260 | A | * | 9/1992 | Chigira | ...................... 359/694 |
| 5,258,798 | A | * | 11/1993 | Iida et al. | ...................... 396/82 |
| 5,272,567 | A | * | 12/1993 | Inoue | ...................... 359/696 |
| 5,298,933 | A | * | 3/1994 | Chigira | ...................... 396/82 |
| 5,377,048 | A | * | 12/1994 | Tada et al. | ...................... 359/823 |
| 6,553,185 | B1 | * | 4/2003 | Inaba et al. | ...................... 396/85 |

\* cited by examiner

*Primary Examiner*—Loha Ben
(74) *Attorney, Agent, or Firm*—Cowan, Liebowitz & Latman, P.C.

(57) ABSTRACT

A lead screw is fittingly supported by a support member at one spot in a rotatable manner. A guide member is supported by the support member through press fitting of a one-end portion. The lead screw and the guide member are supported on one side in this manner, so there is no need to provide dedicated components for supporting the lead screw and the guide axis, and a lens barrel is made compact.

6 Claims, 3 Drawing Sheets

US 7,142,378 B2

LENS GUIDE APPARATUS

BACKGROUND OF THE INVENTION

1. Field of the Invention

The present invention relates to a lens guide apparatus that supports a lens holder of a camera or the like movably in an optical axis direction.

2. Related Background Art

Among conventional lens guide apparatuses of this type, there is a lens guide apparatus that moves a lens holder forward and backward with respect to an optical axis direction in the following manner. That is, a lead screw is rotated using a stepping motor or the like as a drive source, and a lens holder moves forward and backward with respect to an optical axis direction along with the rotation of the lead screw through a nut having a female screw portion that engages with the lead screw. There is also a lens guide apparatus that has a lens holder slidably fitted onto a guide axis and guides the lens holder along an optical axis direction, to thereby support a lens. In such a lens guide apparatus, a lead screw is directly provided for a drive axis of a motor. Accordingly, the lead screw rotates at the same time as the motor rotates. In conjunction with the rotation of the lead screw, the lens holder moves forward and backward with respect to the photographing optical axis direction. Also, the guide axis is supported by a support bottom board through press fitting (Japanese Patent Application Laid-Open No. 2001-66665). Further, there is a lens guide apparatus in which a lead screw and a guide axis are supported on both sides.

In the case of the lens guide apparatus described in Japanese Patent Application No. 2001-66665, however, a dimension thereof in the optical axis direction becomes large to some extent. This is because the lead screw is directly provided for the drive axis of the motor. Also, in the case of the lens guide apparatus in which the lead screw is supported on both sides, a lens barrel increases in size. This is because dedicated components for the both-side support are required, so the number of components is increased and a length in the optical axis direction should also be increased.

Further, in the case of the lens guide apparatus in which one-side support is achieved by press-fitting one end of the guide axis into the support bottom board, there is a problem in that optical performance is not guaranteed. This is because a press-fitting portion has a straight axis, so the guide axis is inclined at the time of the press fitting.

SUMMARY OF THE INVENTION

A first object of the present invention is to provide a lens moving and supporting technique with which there is no need to provide dedicated components for supporting a lead screw and a guide axis, and a lens barrel can be made compact.

A second object of the present invention is to provide a lens moving and supporting technique with which it becomes possible to guarantee optical performance with accuracy while attaining the first object of the present invention. Therefore, with the technical idea disclosed in this application, a lead screw is fittingly supported by a support member at one spot in a rotatable manner. Further, a guide member is supported by the support member through press fitting of a one-end portion. Still further, the lead screw is fittingly supported by the support member at one spot in a rotatable manner, and the guide member is supported by the support member through press fitting of a one-end portion.

DESCRIPTION OF THE PREFERRED EMBODIMENTS

The best mode for carrying out the present invention will now be described based on an embodiment.

Figure 1:
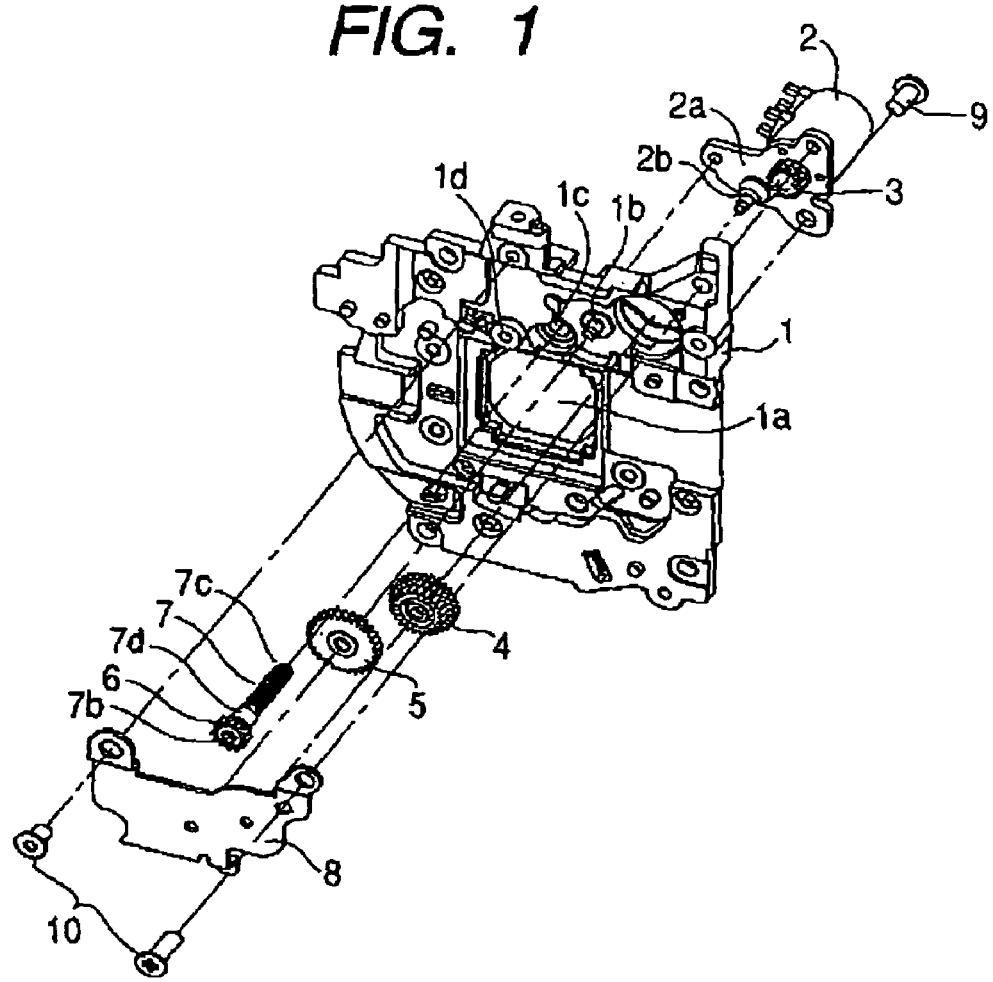
FIG. 1 is a disassembled perspective view showing a construction related to lens moving in an embodiment of the present invention.
Figure 2:
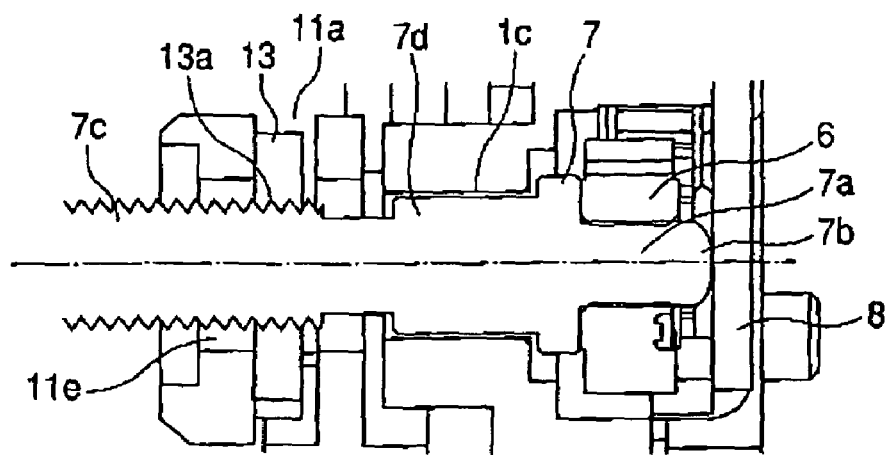
FIG. 2 is a partial cross-sectional view showing a support structure for a lead screw in the embodiment of the present invention.
Figure 3:
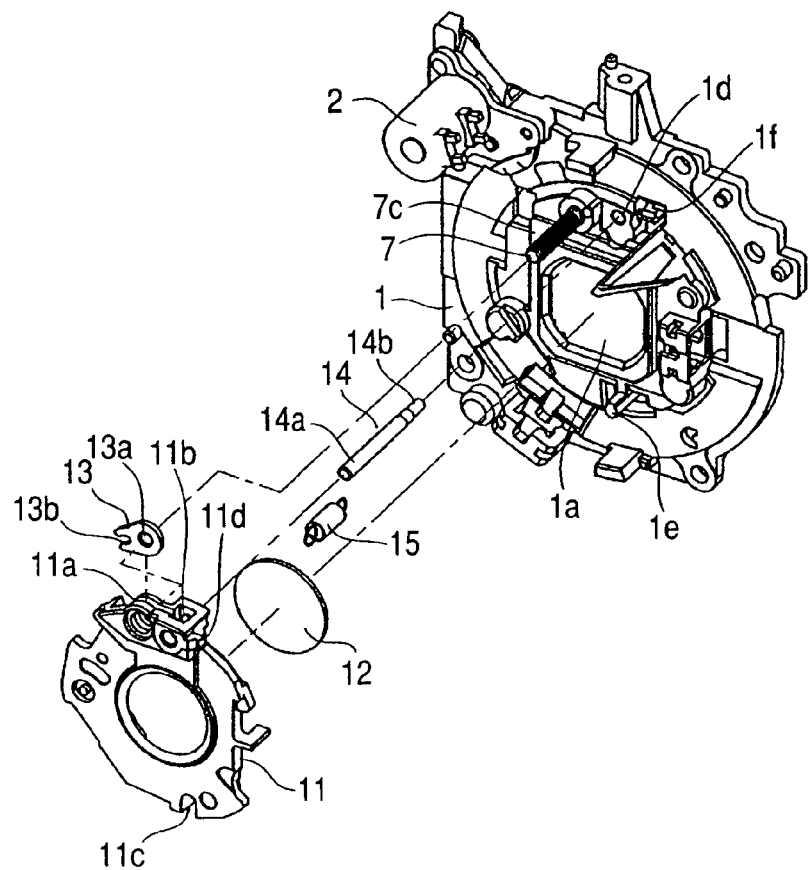
FIG. 3 is a disassembled perspective view showing a construction related to lens supporting in the embodiment of the present invention.
Figure 4:
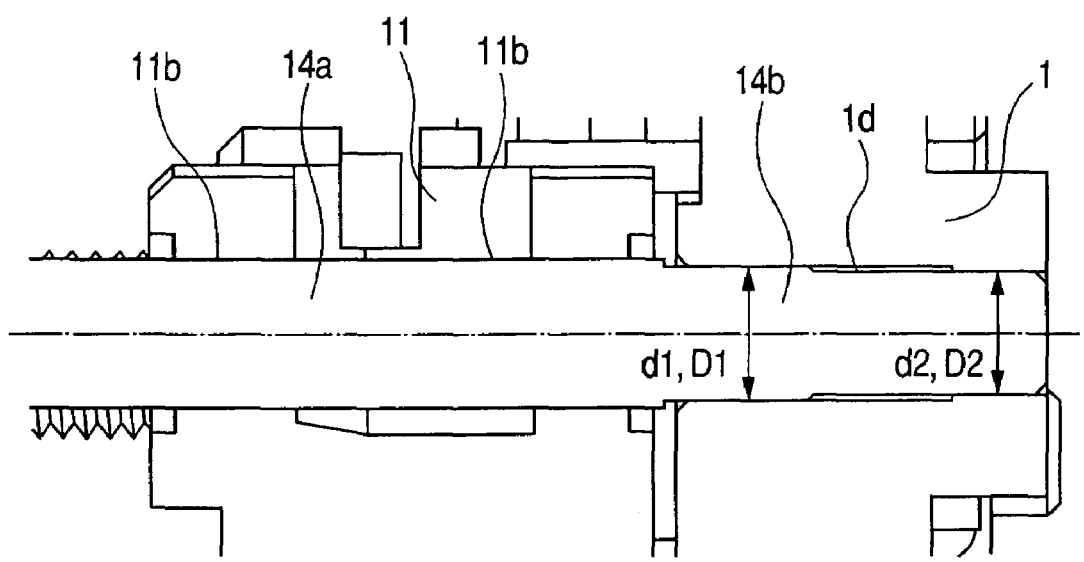
FIG. 4 is a partial cross-sectional view showing a support structure for a guide bar in the embodiment of the present invention.
Figure 5:
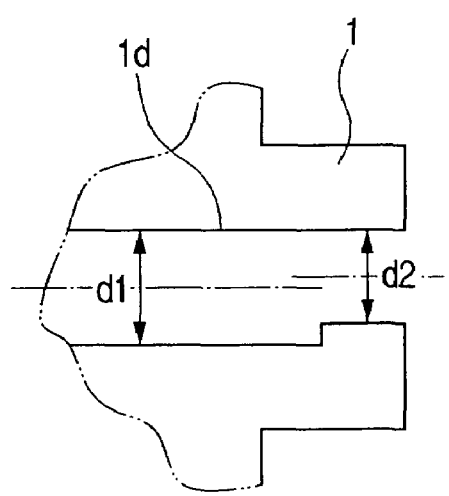
FIG. 5 is a partial cross-sectional view showing a state, in which the centers of inside diameters of a fixing hole of a CCD bottom board are displaced from each other, in the embodiment of the present invention.

FIGS. 1 to 5 each show a lens guide apparatus according to the embodiment of the present invention. More specifically, FIG. 1 is a disassembled perspective view showing a construction related to lens moving, and FIG. 2 is a partial cross-sectional view showing a support structure for a lead screw. Also, FIG. 3 is a disassembled perspective view showing a construction related to lens supporting, FIG. 4 is a partial cross-sectional view showing a support structure for a guide bar, and FIG. 5 is a partial cross-sectional view showing a state in which the centers of inside diameters of a fixing hole of a CCD bottom board are displaced from each other.

A construction related to lens moving will be described with reference to FIG. 1. In FIG. 1, reference numeral 1 denotes a CCD bottom board, reference numeral 2 indicates a drive motor, and reference numerals 4 and 5 each represent a reduction gear. Also, in FIG. 1, attached to the CCD bottom board 1 are a lead screw 7, and a gear cover 8 that holds the reduction gears 4 and 5 and the lead screw 7. An image pick up element chamber 1a is formed in a photographing optical axis center portion of the CCD bottom board 1 for accommodating an optical low-pass filter (not shown) and image pick up element (not shown). Also, formed in the CCD bottom board 1 are a support axis 1b for fittingly supporting the reduction gear 5 in a rotatable manner, a support hole 1c for fittingly supporting the lead screw 7 in a rotatable manner, and a fixing hole 1d for fixing a guide bar 14 to be described later.

A gear 3 is press-fitted onto a motor rotation axis of the drive motor 2. Also, the drive motor 2 is held by the CCD bottom board 1 through a fixing screw 9. A support axis 2b for fittingly supporting the reduction gear 4 in a rotatable manner is provided for a flange portion 2a of the drive motor 2. The reduction gear 4 is fittingly supported by the support axis 2b in a rotatable manner.

The reduction gear 4 is fittingly supported by the support axis 2b of the drive motor 2 in a rotatable manner as described above, to thereby engage with the gear 3. Through the engagement, rotation force of the drive motor 2 is transmitted from the gear 3 to the reduction gear 4. Also, the reduction gear 5 is fittingly supported by the support axis 1b of the CCD bottom board 1 in a rotatable manner to be engaged with the reduction gear 4, and the rotation force of the drive motor 2 is transmitted from the reduction gear 4 to the reduction gear 5 through the engagement therebetween. Tip ends of the support axes 1b and 2b are held by the gear cover 8, and the gear cover 8 is fixed to the CCD bottom board 1.

The lead screw 7 is arranged in parallel with a photographing optical axis (optical axis). The lead screw 7 is positioned in an optical axis direction and is supported by the CCD bottom board 1 at one spot (support hole 1c). Specifically, the lead screw 7 is fittingly supported by the support hole 1c of the CCD bottom board 1 in a rotatable manner in proximity to press fitting of a gear 6, and a tip end portion 7b of the lead screw 7 abuts on the gear cover 8. The gear 6 that integrally rotates with the lead screw 7 is press-fitted onto the lead screw 7 to be engaged with the reduction gear 5, and the rotation force of the drive motor 2 is transmitted from the reduction gear 5 to the gear 6 through engagement therebetween. A male screw portion 7c for moving a lens holder 11 (FIG. 3) in the optical axis direction is formed at a position spaced apart from the press-fitting position of the gear 6 across a fitting portion 7d.

The gear cover 8 is fixed to the CCD bottom board 1 using two fixing screws 10, to thereby hold the reduction gears 4 and 5 and the lead screw 7 between the gear cover 8 and the CCD bottom board 1.

A support structure for the lead screw 7 will be described with reference to FIG. 2. In FIG. 2, the lead screw 7 is fittingly supported by the CCD bottom board 1 in a rotatable manner, with a predetermined fitting play being provided between the fitting portion 7d of the lead screw 7 and the support hole 1c of the CCD bottom board 1. The predetermined fitting play corresponds to a fitting play amount with which the male screw portion 7c of the lead screw 7 is prevented from interfering with a hole lie of the lens holder 11 even when the lead screw 7 rotates to be inclined under a state in which the lens holder 11 is sent out in the optical axis direction. The end portion of the male screw portion 7c of the lead screw 7 is not supported, and the lead screw 7 is supported through fitting at one spot between the fitting portion 7d of the lead screw 7 and the support hole 1c of the CCD bottom board 1. That is, the lead screw 7 is fittingly supported by the CCD bottom board 1 in a rotatable manner under a one-side support state. Also, in order to prevent the tip end portion 7b of the lead screw 7 from biting into the gear cover 8 even when the lead screw 7 is inclined by the fitting play amount, the tip end portion 7b is formed in a spherical shape. This is based on the fact that the certain fitting play is given to the lead screw 7. The male screw portion 7c of the lead screw 7 meshes with a female screw portion 13a of a nut 13 and passes through the hole 11e of the lens holder 11.

A construction related to lens supporting will be described with reference to FIG. 3. In FIG. 3, reference numeral 11 denotes the lens holder to which a photographing lens 12, the nut 13, the guide bar 14, and a tension spring 15 are attached. The photographing lens 12 is held by the lens holder 11 through swaging, and a guide hole 11b of the lens holder 11 and a fitting portion 14a of the guide bar 14 are slidably fitted to each other. Through the slidable fitting, the lens holder 11 is supported by the CCD bottom board 1. Also, a swing stopper groove portion 11c of the lens holder 11 is slidably fitted onto a swing stopper axis 1e formed for the CCD bottom board 1 in parallel with the optical axis, to thereby prevent swinging of the lens holder 11 in a rotation direction.

The nut 13 has the female screw portion 13a formed to mesh with the male screw portion 7c of the lead screw 7. Swinging of the nut 13 in the rotation direction of the nut 13 is prevented in a following manner. That is, the nut 13 is slidably accommodated in an accommodation portion 11a of the lens holder 11, such that a swing stopper axis (not shown) formed for the lens holder 11 is inserted into a long groove portion 13b formed for the nut 13. In this embodiment, the nut 13 and the lens holder 11 are constructed as separated components, although they may be integrated with each other. This is because the lead screw 7 is supported with the certain fitting play being provided between the fitting portion 7d of the lead screw 7 and the support hole 1c of the CCD bottom board 1.

The guide bar 14 is arranged in parallel with the optical axis and is supported on one side through press fitting of a one-end portion of the guide bar 14 into the fixing hole 1d of the CCD bottom board 1. The guide hole 11b of the lens holder 11 is slidably fitted onto the fitting portion 14a of the guide bar 14, so that the lens holder 11 is supported by the CCD bottom board 1.

One end of the tension spring 15 is hooked on a hook 1f, and the other end thereof is hooked on a hook 11d of the lens holder 11, such that the tension spring 15 energizes the lens holder 11 in an accommodation direction (toward the CCD bottom board). The hook if is formed for the CCD bottom board 1, and the hook lid is formed in proximity to the guide hole 11b.

A support structure for the guide bar 14 will be described with reference to FIG. 4. In FIG. 4, the tip end portion of the fitting portion 14a of the guide bar 14 on a side opposite to the press-fitting portion 14b is not supported. The press-fitting portion 14b of the guide bar 14 is press-fitted into the fixing hole 1d of the CCD bottom board 1, so that the guide bar 14 is supported in a one-end portion. That is, like the lead screw 7, the guide bar 14 is supported by the CCD bottom board 1 under a one-side support state. When the guide bar 14 is inclined, the lens holder 11 supported by the guide bar 14 is also inclined in a like manner. As a result, it becomes impossible to guarantee optical performance. This is because the guide bar 14 is supported under a one-side support state. Therefore, it is important to compensate for the inclination of the guide bar 14. In accordance with the present invention, each of the outside-diameter surface of the press-fitting portion 14b of the guide bar 14 and the inside-diameter surface of the fixing hole 1d of the CCD bottom board 1 is formed in a stepped shape so that each of the diameters is changed in a stepped manner, to thereby correct the inclination of the guide bar 14. This is because the inclination of the guide bar 14 is determined by working accuracy of the fixing hole 1d of the CCD bottom board 1.

A method of correcting the inclination of the guide bar will be described with reference to FIGS. 4 and 5. In FIG. 5, the inclination of the guide bar 14 is corrected by displacing the centers of inside diameters d1 and d2 of the fixing hole 1d of the CCD bottom board 1 from each other. As a method of displacing the centers from each other, a method is used with which the center of the inside diameter d2 of the fixing hole 1d of the CCD bottom board 1 is displaced with respect to the center of the inside diameter d1 of the fixing hole 1d of the CCD bottom board 1. In this embodiment, a construction is adopted in which the inclination of the guide bar 14 is corrected by displacing the centers of the inside diameters d1 and d2 of the fixing hole 1d of the CCD bottom board 1 from each other, although the inclination of the guide bar 14 may also be corrected by displacing the centers of outside diameters D1 and D2 of the press-fitting portion 14b of the guide bar 14 from each other. Also, in this embodiment, a construction is used in which the inclination of the guide bar 14 is corrected by displacing the center of the inside diameter d2 with respect to the center of the inside diameter d1, although the inclination of the guide bar 14 may also be corrected by displacing the center of the inside diameter d1 with respect to the center of the inside diameter d2.

Next, an operation in this embodiment will be described.

When-the drive motor 2 rotates, rotation force is transmitted to the gear 6 through the gear 3 and the reduction gears 4 and 5. When the gear 6 receives the rotation force and rotates, the lead screw 7 also rotates in the same direction. When the lead screw 7 rotates, the male screw portion 7c of the lead screw 7 also rotates to cause the lead screw 7 to move in the optical axis direction along the lead of the male screw portion 7c. This is because the nut 13 is prevented from rotating by the swing stopper axis (not shown). Movement of the nut 13 is directly transmitted to the lens holder 11, and the lens holder 11 moves forward and backward with respect to the optical axis direction along the fitting portion 14a of the guide bar 14. This is because the nut 13 is accommodated in the accommodation portion 11a of the lens holder 11.

According to this embodiment, the lead screw 7 and the guide bar 14 are supported on one side, so there is no need to provide dedicated support components, which makes it possible to reduce the number of components. Also, when the lens barrel is set at an end-collapsed position that is a non-photographing state, it is possible to move the components constituting the lens barrel to positions in proximity to the lead screw 7 and the guide bar 14. Therefore, it becomes possible to make the lens barrel compact. Further, as described above, the fixing hole 1d of the CCD bottom board 1 and the press-fitting portion 14b of the guide bar 14 are each formed in a stepped shape so that each of the diameters is changed in a stepped manner. Therefore, it becomes possible to correct inclination of the guide bar 14 with ease, which makes it possible to guarantee optical performance with accuracy. Still further, the lead screw 7 is supported by the CCD bottom board 1, with the certain fitting play being provided between the fitting portion 7d of the lead screw 7 and the support hole 1c of the CCD bottom board 1. Therefore, it become possible to integrate the lens holder 11 and the nut 13 with each other, which makes it possible to reduce the number of components.

It should be noted here that the technical idea of the present invention is usable as an apparatus that supports a lens holder of a digital camera, a silver-salt camera, a video camera, binoculars, or another optical device, movably in an optical axis direction.

This application claims priority from Japanese Patent Application No. 2004-292705 filed on Oct. 5, 2004, which is hereby incorporated by reference herein.

What is claimed is:

1. A lens guide apparatus for guiding a lens holder along an optical axis direction, comprising:
   a lens holder that holds a lens;
   a lead screw that moves the lens holder forward and backward with respect to an optical axis direction;
   a support member that supports an image pick up element, wherein the lead screw is fittingly supported by the support member at one spot in a rotatable manner.

2. A lens guide apparatus according to claim 1, wherein a screw portion that meshes with the lead screw is integrally formed into the lens holder.

3. A lens guide apparatus according to one of claims 1 and 2,
   wherein the lead screw is fittingly supported by the support member in the rotatable manner, with a predetermined fitting play being provided between the lead screw and the support member.

4. A lens guide apparatus for guiding a lens holder along an optical axis direction, comprising:
   a lens holder that holds a lens;
   a guide member that guides the lens holder along the optical axis direction; and
   a support member that supports an image pick up element, wherein the guide member is supported by the support member through press fitting of a one-end portion.

5. A lens guide apparatus according to claim 4,
   wherein a press-fitting portion of the guide member is formed in a stepped shape to have different outside diameters, and a fixing hole of the support member, into which the press-fitting portion is. press-fitted, is formed in a stepped shape to have different inside diameters, wherein centers of the diameters are displaced from each other.

6. A lens guide apparatus for guiding a lens holder along an optical axis direction, comprising:
   a lens holder for holding a lens;
   a lead screw for moving the lens holder forward and backward with respect to an optical axis direction;
   a guide member for guiding the lens holder along the optical axis direction; and
   a support member for supporting an image pick up element,
   wherein the lead screw is fittingly supported by the support member at one spot in a rotatable manner, and the guide member is supported by the support member through press fitting of a one-end portion.

* * * * *

UNITED STATES PATENT AND TRADEMARK OFFICE
CERTIFICATE OF CORRECTION

| | | |
|---|---|---|
| PATENT NO. | : 7,142,378 B2 | Page 1 of 1 |
| APPLICATION NO. | : 11/243620 | |
| DATED | : November 28, 2006 | |
| INVENTOR(S) | : Hiroyuki Hase | |

It is certified that error appears in the above-identified patent and that said Letters Patent is hereby corrected as shown below:

Column 3, line 39, delete "hole lie" and insert -- hole 11e --

Column 4, line 29, delete "hook if" and insert -- hook 1f --

Column 4, line 30, delete "hook lid" and insert -- hook 11d --

Column 5, line 10, delete "diameter dl" and insert -- diameter d1 --

Signed and Sealed this

Fourth Day of September, 2007

JON W. DUDAS
*Director of the United States Patent and Trademark Office*